United States Patent
Fogelstrom

(10) Patent No.: US 7,363,127 B2
(45) Date of Patent: Apr. 22, 2008

(54) AIR BRAKE SYSTEM MONITORING FOR PRE-TRIP INSPECTION

(75) Inventor: Kenneth A. Fogelstrom, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 701 days.

(21) Appl. No.: 10/862,836

(22) Filed: Jun. 7, 2004

(65) Prior Publication Data

US 2005/0273227 A1    Dec. 8, 2005

(51) Int. Cl.
G01M 17/00 (2006.01)
G06F 7/00 (2006.01)
G06F 19/00 (2006.01)

(52) U.S. Cl. .................. 701/29; 73/865.9; 60/611; 701/31; 701/34

(58) Field of Classification Search ............... 701/36, 701/29, 31, 34; 477/183; 60/611; 73/865.9
See application file for complete search history.

(56) References Cited

U.S. PATENT DOCUMENTS

| | | | | |
|---|---|---|---|---|
| 3,823,792 A | * | 7/1974 | Dinkloh et al. | 180/14.3 |
| 3,986,575 A | * | 10/1976 | Eggmann | 180/302 |
| 4,290,268 A | * | 9/1981 | Lowther | 60/668 |
| 4,520,840 A | * | 6/1985 | Michel | 137/259 |
| 4,537,038 A | * | 8/1985 | Alsenz et al. | 62/118 |
| 4,755,803 A | * | 7/1988 | Shockley et al. | 340/452 |
| 4,798,053 A | * | 1/1989 | Chang | 60/712 |
| 4,882,906 A | * | 11/1989 | Sekiyama et al. | 60/624 |
| 5,119,633 A | * | 6/1992 | Brooks et al. | 60/624 |
| 5,505,675 A | * | 4/1996 | Kuriyama et al. | 477/156 |
| 5,549,174 A | * | 8/1996 | Reis | 180/165 |
| 5,819,538 A | * | 10/1998 | Lawson, Jr. | 60/611 |
| 5,830,105 A | * | 11/1998 | Iizuka | 477/92 |
| 5,884,482 A | * | 3/1999 | Lange et al. | 60/624 |
| 6,023,929 A | * | 2/2000 | Ma | 60/295 |
| 6,115,653 A | | 9/2000 | Bergström | |
| 6,120,107 A | * | 9/2000 | Eslinger | 303/1 |
| 6,314,734 B1 | * | 11/2001 | Enander | 60/602 |
| 6,318,817 B1 | * | 11/2001 | Martin et al. | 303/116.1 |
| 6,391,098 B1 | * | 5/2002 | Thomas | 96/111 |

(Continued)

OTHER PUBLICATIONS

Electric power load management: Some technical, economic, regulatory and social issues, Morgan, M.G.; Talukdar, S.N.; Proceedings of the IEEE, vol. 67, Issue 2, Feb. 1979 pp. 241-312.*

(Continued)

Primary Examiner—Cuong Nguyen
(74) Attorney, Agent, or Firm—Jeffrey P. Calfa; Gerald W. Askew

(57) ABSTRACT

Vehicles equipped with air brake systems and compressed air systems for supporting operation of the brakes provide for automated inspection of the air compressor system using an onboard vehicle or engine management computers. During vehicle operation, the system continuously monitors tank leakage, charge time, cut-in and cut-out pressures. Based on the results of this monitoring, the system can indicate whether or not a manual inspection is necessary. If not necessary provides driver with evidence of lack of need.

15 Claims, 11 Drawing Sheets

U.S. PATENT DOCUMENTS

| | | | |
|---|---|---|---|
| 6,553,290 B1 | 4/2003 | Pillar | |
| 6,568,186 B2* | 5/2003 | Zaleski | 60/698 |
| 6,650,977 B2 | 11/2003 | Miller | |
| 6,682,459 B1* | 1/2004 | Knight | 477/183 |
| 6,922,997 B1* | 8/2005 | Larson et al. | 60/611 |
| 7,050,900 B2* | 5/2006 | Miller et al. | 701/103 |
| 7,089,815 B2* | 8/2006 | Fogelstrom | 73/865.9 |
| 7,177,751 B2* | 2/2007 | Froloff et al. | 701/102 |
| 2005/0273227 A1* | 12/2005 | Fogelstrom | 701/29 |

OTHER PUBLICATIONS

Hybrid soft computing systems: industrial and commercial applications, Bonissone, P.P.; Yu-To Chen; Goebel, K.; Khedkar, P.S.; Proceedings of the IEEE, vol. 87, Issue 9, Sep. 1999 pp. 1641-1667, Digital Object Identifier 10.1109/5.784245.*

An overview of electric vehicle technology, Chan, C.C.; Proceedings of the IEEE, vol. 81, Issue 9, Sep. 1993 pp. 1202-1213, Digital Object Identifier 10.1109/5.237530.*

Control of diesel engines, Guzzella, L.; Amstutz, A.; Control Systems Magazine, IEEE vol. 18, Issue 5, Oct. 1998 pp. 53-71, Digital Object Identifier 10.1109/37.722253.*

Control system design for steady state operation and mode switching of an engine with cylinder deactivation, Michelini, J.; Glugla, C.; American Control Conference, 2003. Proceedings of the 2003, vol. 4, Jun. 4-6, 2003 pp. 3125-3129 vol. 4 Digital Object Identifier 10.1109/ACC.2003.1244009.*

A method for future cost estimation of hybrid electric vehicle, Pill-Soo Kim; Young Kim; Byung-You Hong; Power Electronics and Drive Systems, 1999. PEDS '99. Proceedings of the IEEE 1999 International Conference on vol. 1, Jul. 27-29, 1999 pp. 315-320 vol. 1, Digital Object Identifer 10.1109/PEDS.1999.794581.*

IEEE Standard for Electrical and Electronic Control Apparatus on Rail Vehicles, 2005 pp. 0_1-40, Digital Object Identifier 10.1109/IEEESTD.2005.96283.*

IEEE guide for operation and maintenance of hydro-generators, Feb. 19, 1999.*

* cited by examiner

AIR BRAKE SYSTEM MONITORING FOR PRE-TRIP INSPECTION

BACKGROUND OF THE INVENTION

1. Technical Field

The invention relates to air brake systems for motor vehicles and more particularly to an automated monitoring system for air supply systems used with truck air brakes systems.

2. Description of the Problem

Air compressors on trucks supply pressurized air to a storage system which in turn supports the operation of an air brake system for the truck and trailers pulled by the truck. Other vehicle systems such as air suspension systems may also tap the storage system for air. The periodic testing of the compressor and the air storage and distribution system promotes safe operation of vehicles using such systems. Government motor vehicle regulations set forth operating standards for air compressor systems and require periodic testing before commercial operation of these vehicles.

The air compressor on a truck is typically under the control of a governor which triggers compressor operation in response to falling system pressure. The point where compressor operation engages is called the cut-in pressure. The governor further responds to pressure in the system reaching an upper limit at which point it causes the air compressor to discontinue supplying pressurized air. This point is called the cut-out pressure.

Air compressor system performance varies by manufacturer, by age of the system and by its state of repair. Systems differ in the number of compressed air tanks and in the capacity of the tanks. Some vehicles are equipped with air suspensions which make independent demands on available compressed air. Leakage rates vary from system to system. When new or in good repair an air compressor system should operate at close to its optimal levels. With age and deterioration of the system, the system may come to fall short of these optimal operating values. Inspection regimens should detect failure of a system to operate close to original specification as an indicator of potential failure.

Inspection regimens must be established to comply with government regulations. These regimens check variables such as compressor governor cut-out, governor cut-in and monitor gauge pressure against a clock to determine charge and leak rates. A representative procedure requires a driver or operator to:

"Check Air Compressor Governor Cut-in and Cut-out Pressures. Pumping by the air compressor should start at about 100 psi and stop at about 125 psi. (Check manufacturer's specifications.) Run the engine at a fast idle. The air governor should cut-out the air compressor at about the manufacturer's specified pressure. The air pressure shown by your gauge(s) will stop rising. With the engine idling, step on and off the brake to reduce the air tank pressure. The compressor should cut-in at about the manufacturer's specified cut-in pressure. The pressure should begin to rise."

"Test Air Leakage Rate. With a fully-charged system (typically 125 psi), turn off the engine, release the service brake, and time the air pressure drop. The loss rate should be less than two p.s.i. in one minute for single vehicles and less than three p.s.i. in one minute for combination vehicles. Then apply 90 p.s.i. or more with the brake pedal. After the initial pressure drop, if the air pressure falls more than three p.s.i. in one minute for single vehicles (more than four p.s.i. for combination vehicles), the air loss rate is too much. Check for air leaks and fix before driving vehicle. Otherwise, you could lose your brakes while driving".

"Check Rate of Air Pressure Buildup. When the engine is at operating rpm, the pressure should build from 85 to 100 psi within 45 seconds in dual air systems. (If the vehicle has larger than minimum air tanks, the buildup time can be longer and still be safe. Check the manufacturer's specifications.) In single airsystems (pre-1975), typical requirements are pressure buildup from 50 to 90 psi within three minutes with the engine at an idle speed of 600-900 rpm."

Making these determinations both manually and daily is obviously time consuming. In addition, the or if insufficient date pressure gauges used in making the tests are frequently imprecise and difficult to read.

SUMMARY OF THE INVENTION

According to the invention monitoring of the operating variables of an air compression and storage system for a motor vehicle air brake system is provided. The air compression and storage system include a compressed air storage tank and air distribution system, an air compressor coupled to the compressed air storage tank for charging the air storage tank, and a governor responsive to pressure in the compressed air storage tank and air distribution system for controlling cut-in and cut-out of the air compressor. An air pressure sensor is disposed in communication with the compressed air storage tank and air distribution system and is responsive to air storage tank air pressure for generating an air pressure signal which is applied to a vehicle body computer. The body computer operates on the air pressure signal for determining leakage and charging rates for the compressed air storage tank and air distribution system. The determined rates are compared to threshold limits for generating warning indications. Averages over various periods of time may be kept for comparison to the thresholds. The system is provided for vehicles equipped with an air brake system connected to utilize compressed air from the compressed air storage tank through the air distribution system. The system may further monitor position of a brake pedal for actuating the air brake system as modifying monitoring leakage. Results of the comparison are used to alert the driver as to the need of a follow on manual inspection, with such inspection being indicated if thresholds are broken or in case of a lack of data.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
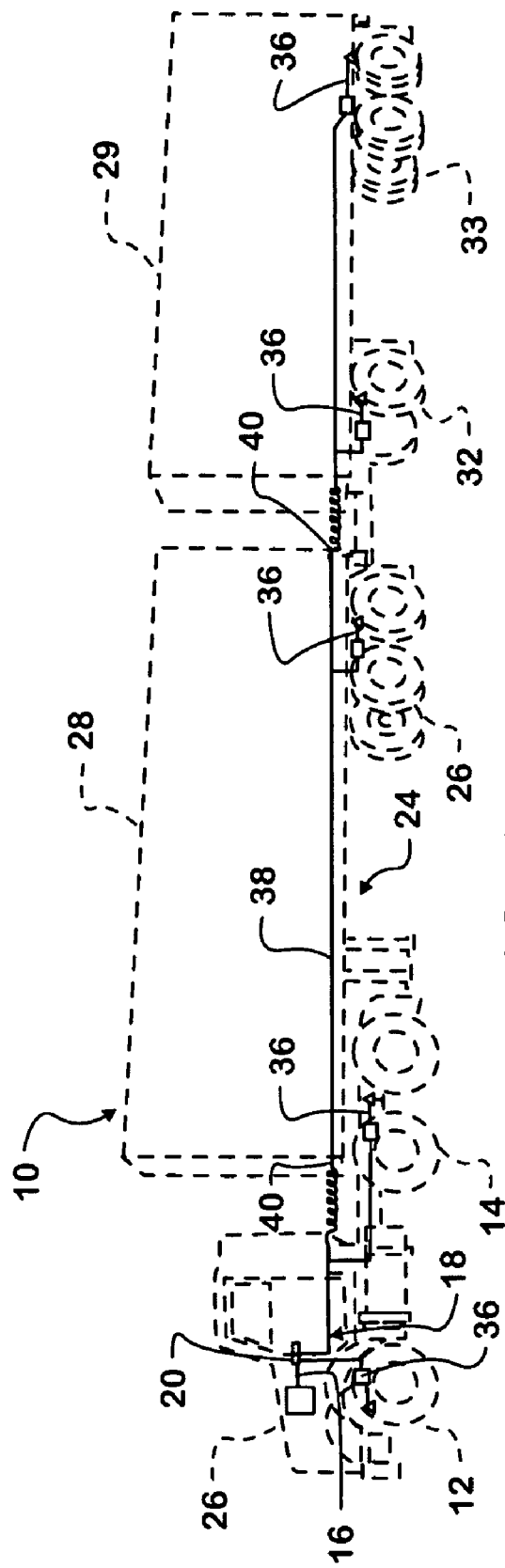
FIG. 1 is a side view of a possible truck/tandem trailer combination illustrating installation of an air brake system with which the invention may be used.

Referring now to the figures and in particular to FIG. 1, a tandem trailer/tractor combination 10 equipped with air brake system 24 is illustrated as a possible environment in which the invention can be applied. Tandem trailer/tractor combination 10 includes a tractor 26 and two trailers, 28 and 29, respectively. Tractor 26 and trailers 28, 29 are supported on wheels 12, 14, 26, 32 and 33, the rotation of which may be slowed or stopped using air pressure actuated brakes 36. Air brake system 24 may be considered as including an air pressurization and storage subsystem including a compressor 16, storage tanks 18 and air lines 20, 40 and 38. The details of air brake system 24 are otherwise conventional.

Figure 2:
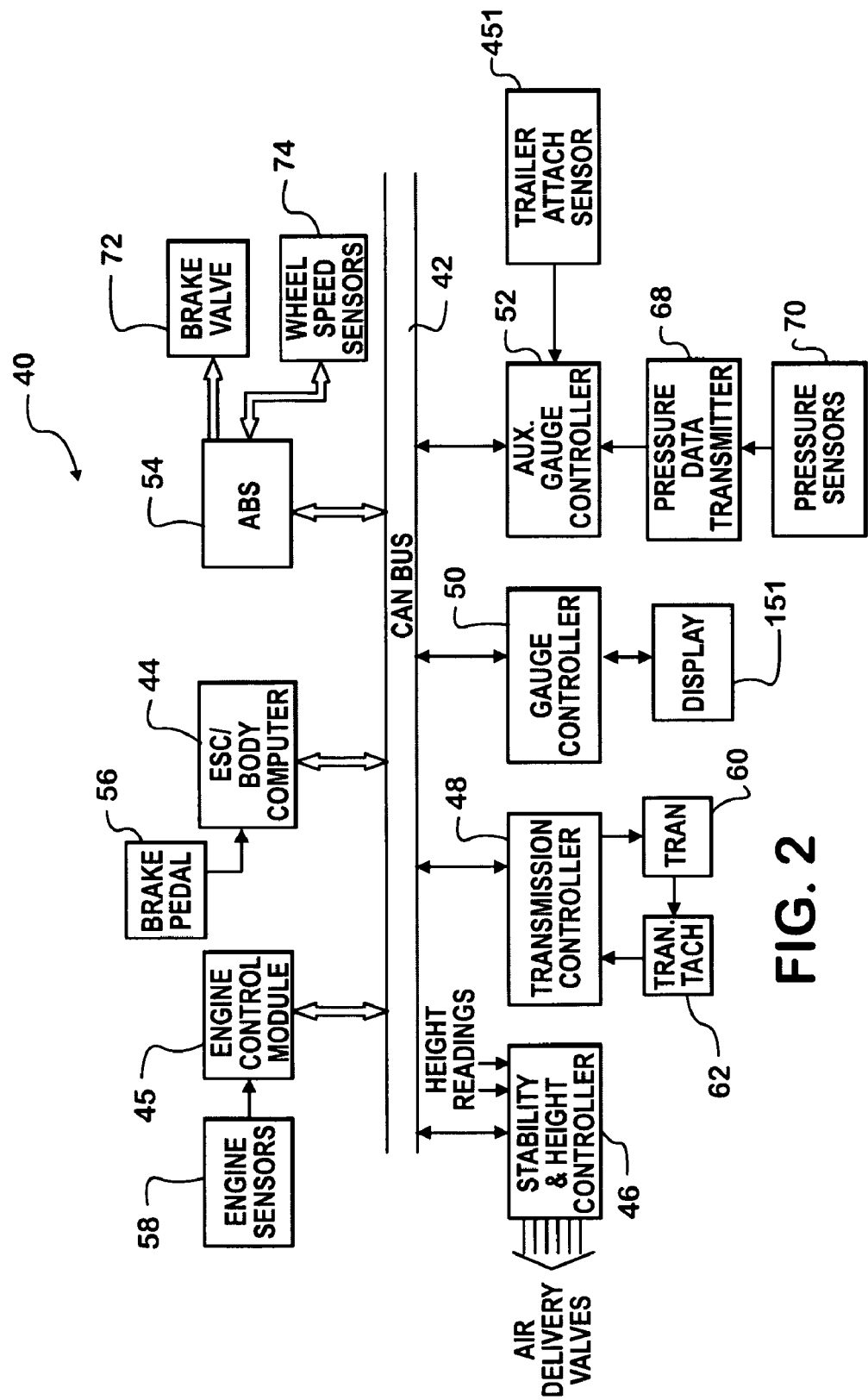
FIG. 2 is a block diagram of a controller area network for a motor vehicle such as shown in FIG. 1.

FIG. 2 illustrates a vehicle electrical control system 40 based on a controller area network (CAN) bus 42. CAN bus 42 conforms to the SAE J1939 protocol and provides for data transmission among a plurality of controllers connected to the bus including, an electrical system controller (ESC)/body computer 44, an engine control module 45, a stability and height controller 46, a transmission controller 48, a gauge controller 50, an auxiliary gauge controller 52 and an anti-lock brake system (ABS) controller 54. These controllers are generally attached to one or more devices the status of which may be transmitted over CAN bus 42 by its associated controller for the use of other controllers. For example, engine controller 45 is generally connected to a plurality of engine sensors 58 including, among other sensors, a crankshaft position sensor from which an engine tachometer indication may be developed. Transmission controller 48 controls a transmission 60 the output of which is measured by a drive shaft tachometer 62. This signal may be used to generate a measurement of vehicle speed. In the preferred embodiment of the present invention engine speed is utilized to, in effect, normalize air pressurization times to a standard engine speed. A stability and height controller 46 controls the inflation of a plurality of air springs forming part of the vehicle suspension and represents one type of an exogenous user of compressed air which complicates measurements of the performance of the air pressurization system. Gauge controller 50 and auxiliary gauge controllers 52 are often used to collect and format telemetry from vehicle sensors. Here various pressure sensors 70, which include an air brake system pressure sensor, are monitored by pressure data transmitters 68 connected to the auxiliary gauge controller 52. Under some circumstances air pressure may be reported directly to the engine control module 45 or to body computer 44. ABS controller 54 provides control over brake valves 72 responsive to signals received from body computer 44 and a plurality of wheel speed sensors 74 directly connected to the ABS controller. Body computer 44, which operates as a coordinator between other controllers, and which is programmable, is typically connected to a brake pedal switch 56 and accordingly determines the brake pedal's position. The various connections between sensors and controllers is somewhat flexible. Drive shaft tachometer 62 may be connected to report its output directly to engine control module 45. A sensor 451 provides detection of an attached trailer. Such warning signals as provided by the present invention may be communicated over bus 42 from Body computer 44 to gauge controller 50 for display on display 151.

Figure 3:
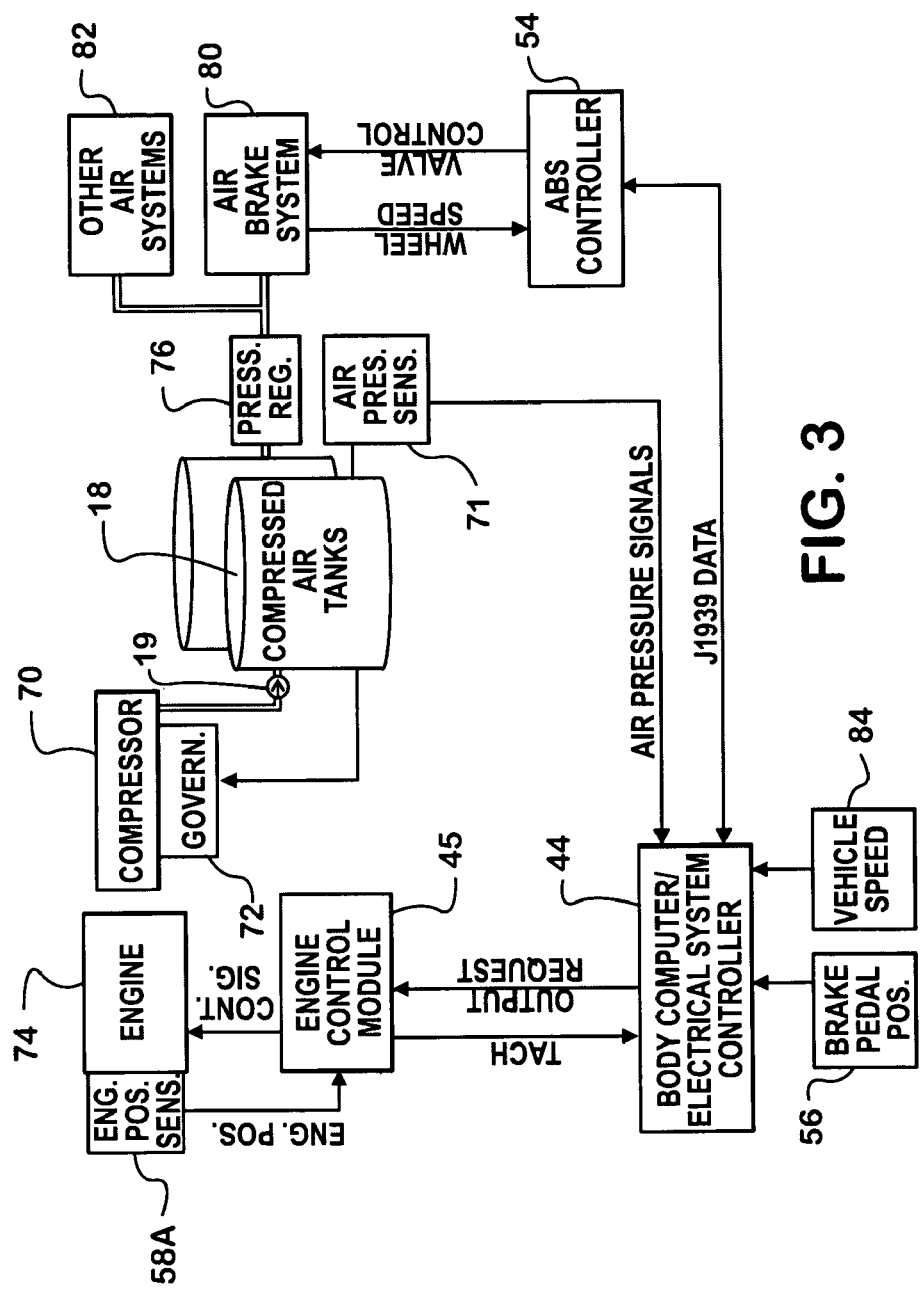
FIG. 3 is a detailed block diagram of interacting components of the controller area network and the air brake system.

FIG. 3 is a simplified schematic illustration of a set of controllers for an air brake system 80. A vehicle engine 74 is mechanically coupled to drive a compressor 70 on demand to supply air by a check valve 19 to compressed air storage tanks 18. Components of a conventional air system such as an air dryer and distinct wet and dry tanks will be understood as being present, but are not distinguished for the sake of simplicity in description. Air pressure is maintained by using a compressor 70 under the control of a governor 72, which is responsive to air pressure communicated on a line to one of compressed air tanks 18, usually a wet tank. Such systems are usually designed to maintain air pressure in a range of 100 to 125 psi. Air pressure signals developed by air pressure sensor 71 are passed to body computer 44, typically over CAN bus 42. Air pressure sensor 71 is typically in communication with one of the dry tanks. Where two dry tanks are used either one may be selected as a base for measurements. Body computer 44 receives an engine tachometer signal from engine control module 45. The signal is derived from an engine crankshaft position sensor 58A. Brake pedal position sensor 56 functions as described above. Vehicle speed 84 is supplied from a transmission controller 48 or the engine control module 45, which generate the signal from the drive shaft tachometer. ABS controller 54 and body computer 44 may exchange data relating to air brake system operation 80. The possible existence of other air using systems, such as an air suspension, is represented by a general block 82.

Body computer 44 may be realized as a programmable, general purpose computer having a CAN interface 98 for transmitting and receiving information over the CAN bus 42. Body computer 44 includes a microprocessor or CPU 90 communicating with CAN interface 98 and memory 94 over an internal bus 97. Routines 96 for determining governor cut-in and cut-out pressures and performance and implementation of the inspection regimen are stored in memory 94. The array 95 of values including warning threshold as well as stacks of values for operating variables are also stored in memory 94. CPU 90 utilizes clock signals from a clock 92 and communicates with external sensors 102 over a local interface 100.

Figure 5:
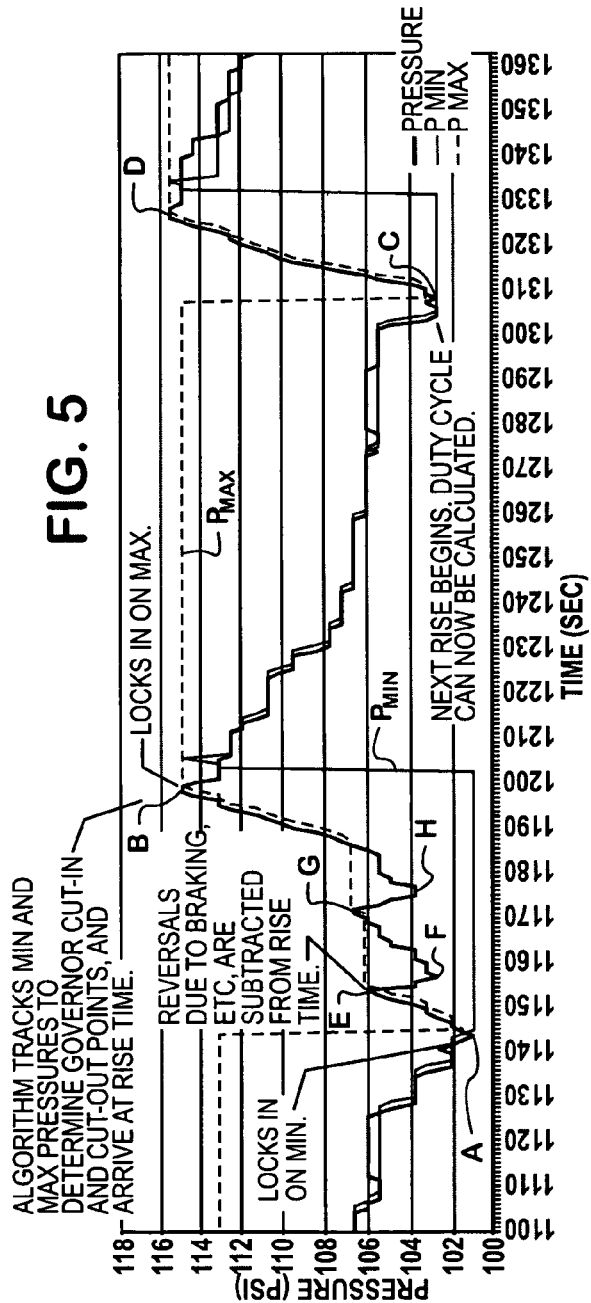
FIG. 5 is a graphical representation of air pressure in a compressed air system used to support operation of air brakes and an air suspension system.
Figure 4:
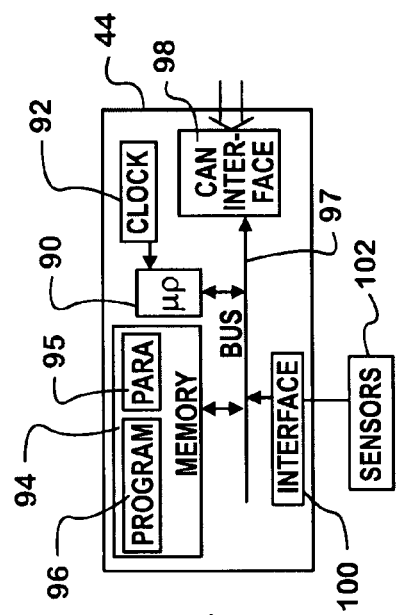
FIG. 4 is a block diagram of an electrical system controller for a controller area network which may be programmed to implement the invention.

FIG. 5 graphically illustrates typical operational pressure variation for an air brake system. The principal line represents air pressure as periodically sampled. P_min and P_max are variables used by program 96 to determine cut_in and cut_out pressures. Two complete recovery or change cycles (A to B and C to D) and one complete cycle of exhaustion (B to C) are represented. P_max is reset to the current pressure reading on each of occurrence of locking on a cut-in pressure (points A and C). P_max tracks the current measured pressure upwardly, ignoring occasional temporary reversals, until it locks on a maximum pressure reading (B and D, i.e. cut-out pressure). P_max holds this value until the next minimum. P_min is held at the last detected cut-in pressure (A and C) until a cut-out is detected, whereupon it is reset to the cut-out pressure, which it tracks downwardly until a upward turning major deflection point is detected. Points A, B, C and D may be characterized as major deflection points. Points E, F, G and H are minor deflection points resulting from changes in the demand for air, and not cut-in or cut-out of the compressor. Time to rise excludes period following negative turning minor deflection points (E and G) until pressure recovers to the level where a negative turning minor deflection point occurred.

Figure 6A:
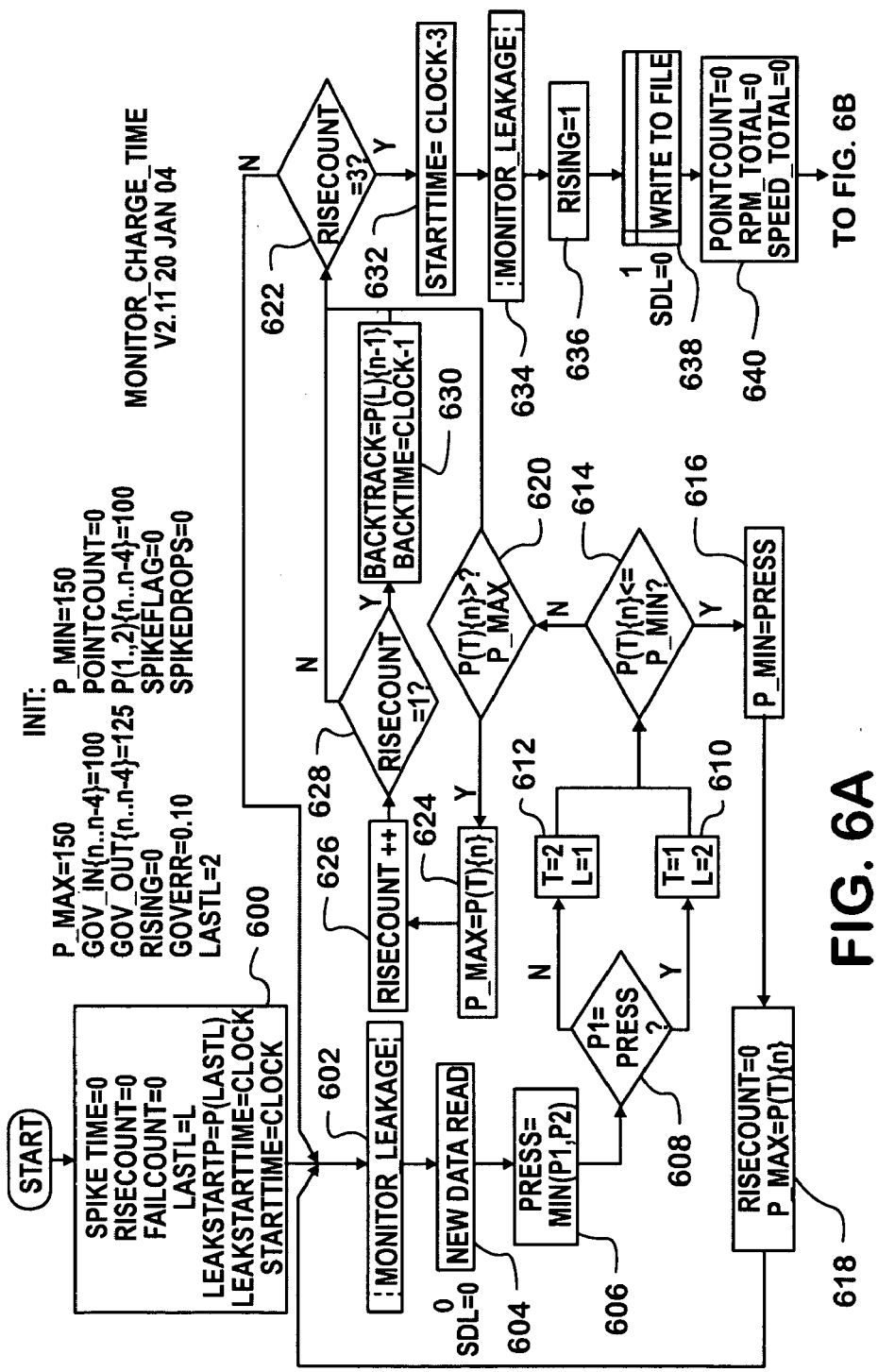
FIGS. 6-10 are flow charts illustrating operation of pre-trip inspection algorithm for a compressed air system.
Figure 6B:
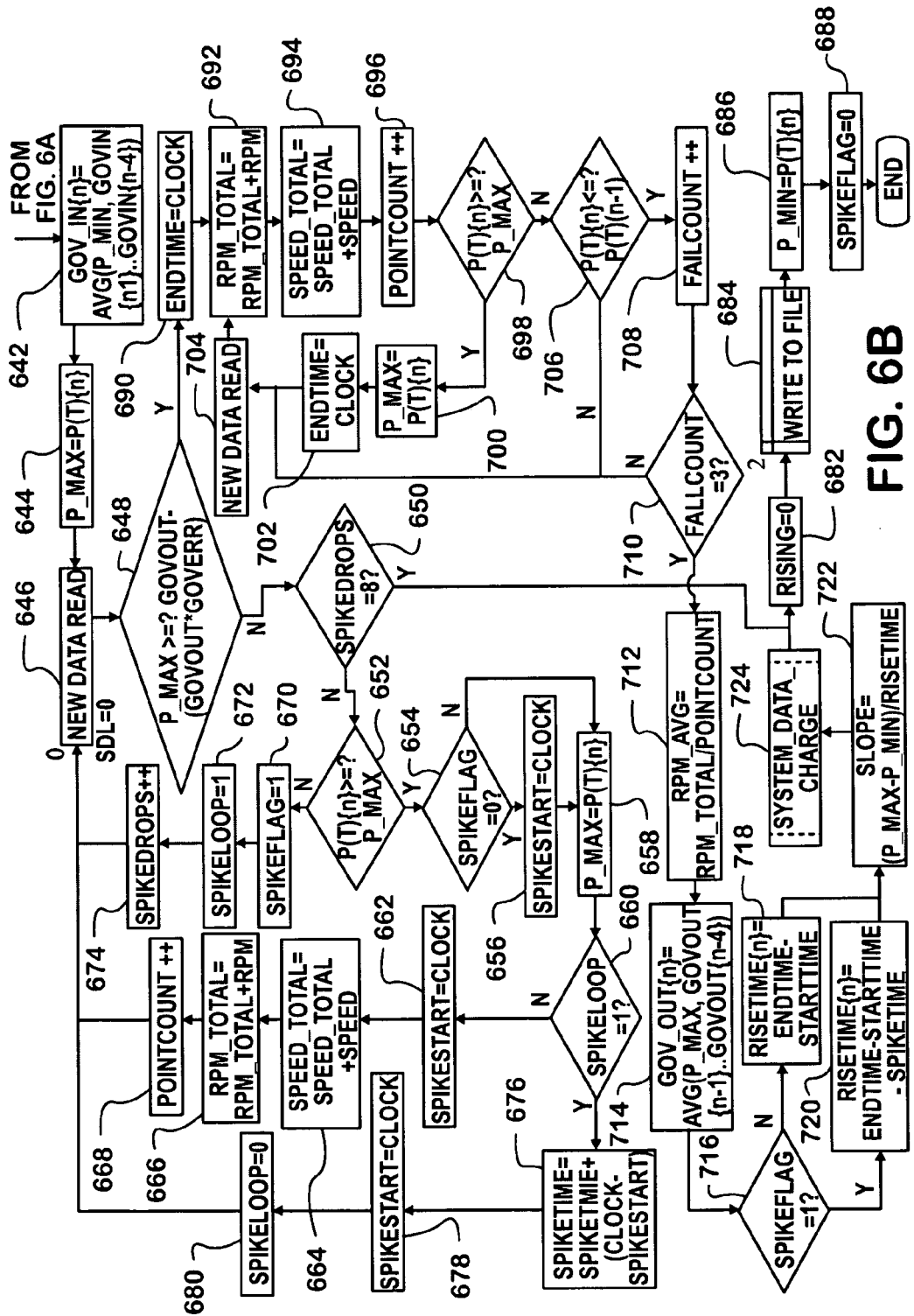

Referring now to FIG. 6 a flow chart illustrates program 96 which is executed on electrical system controller 44 for determining and updating governor cut-in and governor cut-out points and more particularly for generating values for variables used in the inspection algorithm. It should be understood throughout the following discussion relating to routines that the term "n" is a counter which is incremented with each cycle through the routines. Initially it is assumed that the operating characteristics for a vehicle air pressurization system are unknown. This allows embodiments of the invention to be installed on vehicles with different compressor systems with a minimum of programming adaptation. Initial program installation includes definition of a list of variables (Init), which includes proxy values for governor cut-in and cut-out pressures. The "Init" variables are set once on initial execution of program 96 on body computer 44 and perhaps reset after maintenance work on the air compressor system. The program thereafter use values for the variables developed by the program. Other variables are initialized every time the program is called as indicated at Step 600. Measurements of governor cut-in and cut-out are reflected in variable stacks [Gov_In(n, . . . , n−4); Gov_Out(n, . . . , n−4)]. Governor cut-in and cut-out are determined from an average of the current measurement (n) and the four most recent measurements (n−1, n−2, n−3 and n−4). Cut-in should occur at about 100 psi and so all five variables in the stack used for estimating cut-in are initially set to 100. Cut-out should occur at about 125 psi and the five variables in the stack for estimating cut-out are initially set to 125. Two variables, P_max and P_min, are provided which will indicate the end and start points, respectively, of a period of increasing pressure, associated with system charging, during which a determination of the rise slope is made. Both variables are initially given values far higher than should ever appear, here 150. New values will, upon a successful test, be inserted at the top of the stacks Gov_In, Gov_Out. PointCount indicates the current sample count, and is initially 0. Two variable stacks P(1,2){n . . . n−4}=100 provide first in/first out temporary storage of current pressure measurements. Rising and SpikeFlag are flags. LastL is a variable which takes the value 1 or 2 depending upon the outcome of decision step 608 the prior time through the loop (i.e. LastL is set equal to L which is reset each time step 608 is executed, that is LastL is what L was the previous cycle). GovErr is a error factor. LeakStartTime and StartTime are set to the current system clock. SpikeTime is set to zero and will eventually take values representing the time between two pressure events, generally oppositely turning minor deflection points.

Step 602 indicates entry to a rise detection phase of the program, where it is assumed that the compressor is cut-out and the system is losing air pressure due to leakage or exogenous demands for air. Pressure readings P(1) and P(2) for the current period n are taken as indicated at step 604 and the measurements compared to find the lower of the two to which becomes the value for the variable Press. At step 608 it is determined if the variable Press has been set equal to the reading P(1). If YES, variables T and L are set to 1 and 2, respectively (step 610), in NO, variables T and L are set to 2 and 1, respectively (step 612). Following step 610 or 612 a comparison is executed to determine if one of variables P(T){n} (i.e. P(1){n} or P(2){n} where n is the current period) is less than or equal to P_min. Initially the result of the comparison is almost always "YES" since P_min is 150 and any pressure measurement should be less than 125.

Along the YES branch from the comparison P_min is reset to equal Press (step 616), the counter RiseCount is set equal to 0 and P_max is set equal to P(T){n}. Later instances of execution of steps 616 and 618 will be triggered by falling or steady pressure since P_min will be determined by readings from the prior periods. The program then executes a return to step 602 and another set of samples P1, P2 is read.

Consider now the NO branch from the comparison test of step 614. Another comparison step 620 is executed to compare P(T){n} to P_max to determine if P(T){n} is greater than P_max. P_max will always be one of P(T){n−1, n−2, n−3, or n−4} so P(T){n} (see steps 618, 624), which is a current sample, is being compared with an earlier sample in its stack. If the comparison fails execution follows the NO branch to comparison step 622 where it is determined if the counter variable RiseCount has reached its limit value. Because RiseCount has not yet been incremented, and was initially set to 0, the NO branch from step 622 is followed back to step 602 for depression of the stack and the collection of another set of samples. Where P(T){n} is greater than P_max, indicating an increase in the current pressure measurement over any previous recent pressure measurements, execution proceeds along the YES branch from step 620 to step 624, where P_max is reset to P(T){n}. Next, at step 626 the variable RiseCount is incremented and at step 628 it is determined if RiseCount is equal to 1, which will occur only on the first occasion of detection of a possible series of increasing pressure readings. This is the occasion of setting of two variables, BackTrack and BackTime, to the values P(L){n−1} and Clock−1, respectively (step 630). Following step 630 execution returns to step 602 through decision step 622. Only following a "No" determination at step 628 can RiseCount time out, indicating the occurrence of three increases in the maximum pressure reading with a change in the minimum pressure reading. This is taken as an indication of rising pressure.

The portion of the algorithm relating to the response to the detection of rising pressure requires initialization of several variables and counters as indicated in steps 632, 636, and 640. The variables include "StartTime", which is initialized to the value "Clock −3", the flag "Rising", which is set to 1; and three variables, "PointCount", "RPM_total" and "Speed_total", all of which are set to 0. The variables allow adjustments to the measurement of pressure rise time to compensate for engine and vehicle speed. The variable Clock is adjusted by a constant balancing the maximum allowed RiseCount. Leakage continues to be monitored (step 634) and data is recorded (step 638). Governor cut-in pressure is recalculated each time rise detection is initiated and is made equal to the average of the five most recently calculated cut-in pressures. This is provided by taking the average of P_min, GovIn{n−1}, GovIn{n−2}, GovIn{n−3}, and GovIn{n−4} at step 642. The variable P_max is confirmed to be P(T){n} at step 644 and new data is read, resetting P(T){n}, at step 646.

Before the new pressure readings are used for comparison tests the old P_max, carried over from the rise detection phase of the algorithm, is compared to cut-out pressure, less an error factor (GovOut*GovErr), at step 648. Ordinarily, it would be expected that the P_max value has been reset to a value in the P(T) stack at step 624, and should be less than this value and accordingly program execution advances along the NO branch to step 650, where it is determined if the counter "SpikeDrops", which is initially 0, has counted out. If NO, step 652 is executed to determine if pressure has continued to rise and a current pressure measurement P(T){n} is compared to P_max to determine if it is at least equal to the pressure reading from the previous measurements. Normally, on the occasion of the first local instance of execution of the step, the value for P(T){n} can be expected to exceed that for P_max. If it does, the YES branch from step 652 leads to execution of another comparison test, step 654. This step is executed to determine the value of a flag "SpikeFlag", which indicates occurrence of a drop in the current pressure measurement since the most recent detection of rising pressure, i.e. since the last instance of compressor cut-in. The expected value is 0, whereupon process execution skips to step 658, where P_max is reset to the current pressure measurement. If the spike flag is set, step 656 precedes execution of step 658 and the variable "SpikeStart" is set to the current clock for accumulation of rise time.

Following step 658, a determination is made if the "SpikeLoop" flag has been set, indicating an immediately previous occurrence of a current pressure reading falling below the prior period's pressure reading, as detected at step 652. If not, execution proceeds along the branch from step 660 leading to steps 662, 664, 666 and 668. These steps reflect the resetting or incrementation of several variables, including, respectively, resetting "SpikeStart" equal to the current value of Clock; resetting "Speed_Total" to the sum of the previous Speed_Total and current speed measurement; resetting "RPM_Total" to equal to the sum of the old RPM_Total and the current measured RPM; and finally incrementing the counter "PointCount", which will reflect the number of times Speed_Total and RPM_Total are incremented to allow calculation of an average for the two variables. Following step 668 processing returns to step 646 and a new set of variables are read.

Returning to step 652, the case where the current pressure measurement P(T){n} has fallen, or has remained, below a prior measurement during the current rise detected phase of the algorithm is considered. Following the NO branch from step 652 it may be seen that steps 670, 672 and 674 are executed, which in turn set "SpikeFlag" to 1, "SpikeLoop" to 1 and increment the counter "SpikeDrops". SpikeDrops is the most significant of these since its accumulation to a value equal to 8 aborts the rise detect portion of the algorithm when detected at step 650. The YES branch from step 660 is followed only after a prior pass through steps 670, 672 followed by an indication that pressure is again rising prior to an abort. Steps 676, 678 and 680 provide for resetting "SpikeTime" to the old value for SpikeTime plus the current Clock less the time for "SpikeStart". In other words, the elapsed time corresponding to a period when pressure is dropping or is rising, but has not yet recovered to the point where the interruption occurred is accumulated in "SpikeTime". SpikeStart is then set to the current clock and the SpikeLoop flag is reset to 0. Processing returns to step 646 for the collection of new data.

As stated above, accumulation of a "SpikeDrops" count equal to 8 results in the process being aborted. No updates to governor cut_out occur under these circumstances and the process is advanced to a series of exit steps which reflect resetting variables for the next iteration of the leak monitoring and rise detection steps including steps 602 through 630. These steps include resetting the flag termed "Rising" to 0 (step 682), writing data to a file (step 684), resetting P_min to the current pressure measurement P(T){n} (step 686) and resetting the SpikeFlag to 0 (step 688) before the algorithm is exited.

Returning to step 648, the steps of the algorithm occurring once P_max has reached a value close to the governor cut-out pressure less an error factor are considered. Following the YES branch from step 648, timing of rise time must discontinue and accordingly a variable "EndTime" is set equal to the current clock reading (step 690), anticipating that the compressor has been cut out. Next, at steps 692 and 694 the variables RPM_total and Speed_Total are reset and the counter PointCount incremented, tracking steps 664 through 668. RPM's and speed are tracked for the use of other processes. The value accumulated for RiseTime is adjusted as a function of engine RPM's. At this point in the process declining pressure is taken as confirmation of compressor cut-out. The current pressure measurement is compared to P_max at step 698. If the current measurement at least equals P_max, indicating the cut-out has not occurred, P_max is reset to the current pressure measurement, the variable EndTime is reset to the current clock (steps 700, 702) and another set of pressure measurements is taken (step 704). Otherwise, the NO branch from step 698 results in execution of a comparison (step 708) between the current measurement and the pressure measurement for the immediately preceding period. If the current measurement reflects an increase in pressure, processing returns to step 704 for yet another round of data measurements. If the current measurement indicates that pressure is steady or falling since the last measurement, the variable FallCount is incremented and at step 710 it is determined if FallCount has reached a value high enough to trigger an exit from the loop. If not, processing loops back through step 704 for still more pressure measurements. If YES, processing advances to steps providing from redetermination of the expected governor cut-out pressure level.

Both the expected governor cut-out pressure level and the expected rise time from cut-in to cut-out are determined, ignoring intervening demands for air pressure and recovery. Expected rise time may require consideration of operating conditions. First, at step 712, the average of engine RPM measurements made during the rise detected portion of the algorithm is made. Step 712 provides for determining the average "RPM_avg" from the accumulated RPM measurements divided by the number of samples "PointCount". Next, at step 714, a new, current governor cut-out pressure level is determined by averaging the final value for P_max with the prior four determinations of the governor cut-out pressure level. The oldest value is discarded. Rise time determinations take account of interruptions in pressure increase by determining first if any such interruption occurred. Step 716 checks the flag SpikeFlag. If the flag has not been set RiseTime is simply the EndTime of the rise detect portion of the algorithm less its StartTime (step 718). Otherwise RiseTime is adjusted to exclude what is termed "SpikeTime" which accumulates over periods when declining pressure measurements, and recovery from the period, occur (step 720). The time rate of change of pressure over time (Slope) may now be calculated by subtracting final maximum pressure from the initial minimum pressure and dividing the result by RiseTime (step 722) from either step 718 or 720. Slope is used in the inspection routines. The final step preceding the reset steps (steps 682 to 688) is step 724, which provides storage of the calculated slope as "System_Data_Change".

Figure 7A:
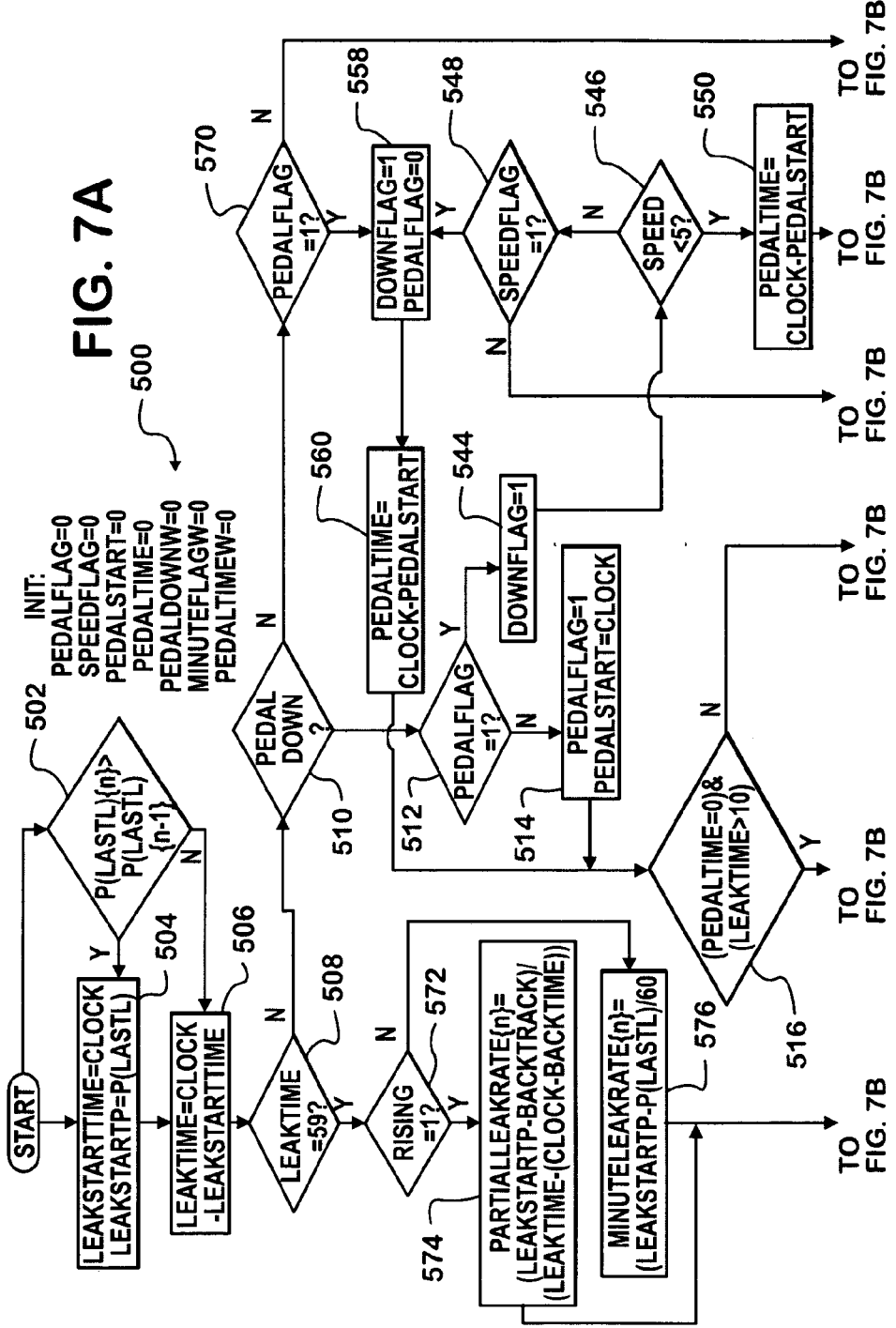
Figure 7B:
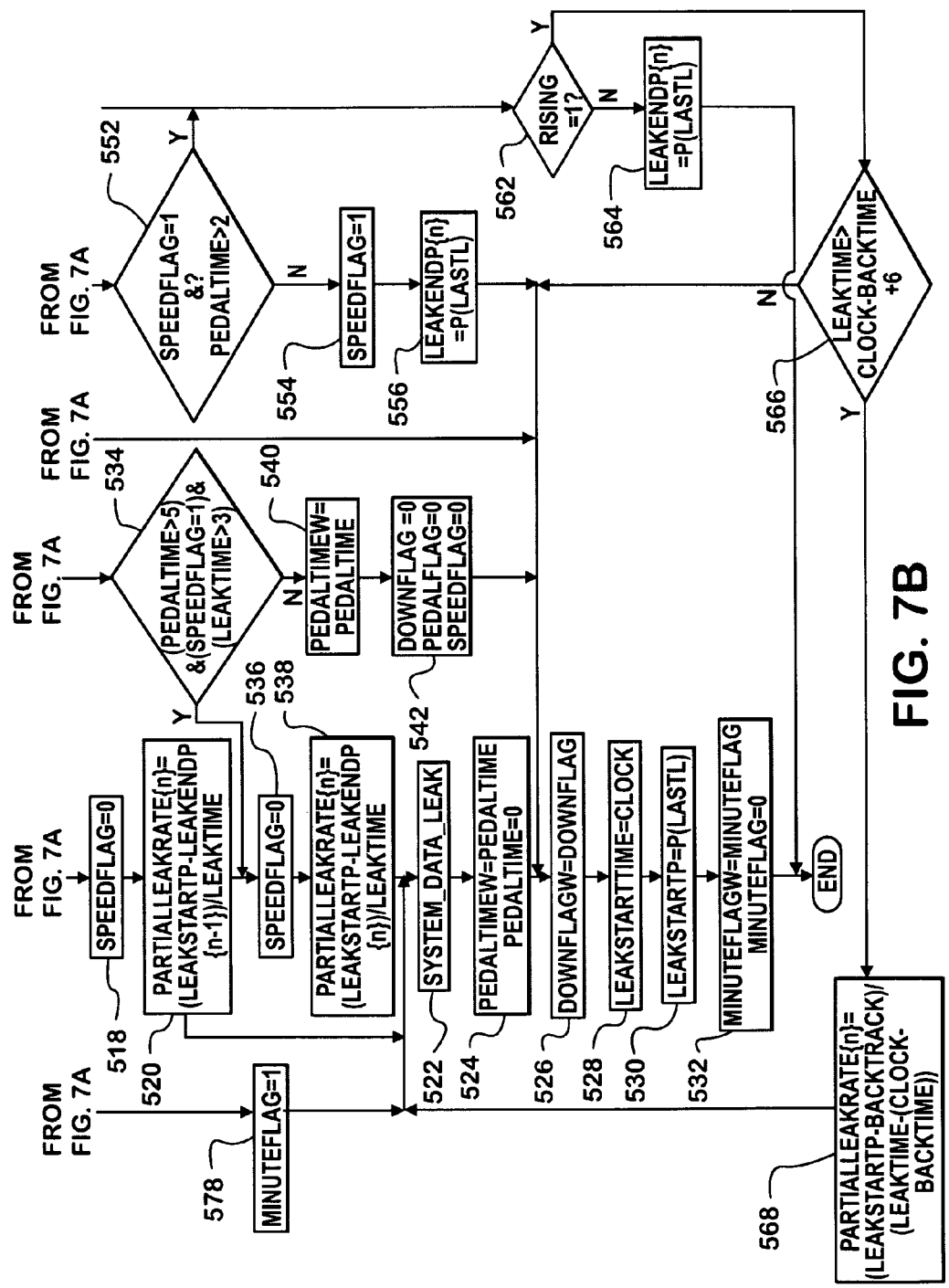

FIG. 7 illustrates a routine executed by body computer 44 monitoring air tank pressure for leakage (the Monitor_Leakage routine). The routine of FIG. 7 is passed the values LastL (step 600), Rising (step 682), BackTime (see step 630) and P(1,2){n, . . . , n−4} from the routine of FIG. 6. List 500 defines a plurality of flags including: PedalFlag; SpeedFlag; PedalStart; PedalTime; PedalDownW; MinuteFlagW; and PedalTimeW, all of which have the initial value 0 on engine start. Step 502 is a simple comparison of pressure measurements from the immediately preceding two measurement cycles, which may be P1{n} or P2{n} against either P1{n−1} or P2{n−2}. Depending upon the result of the comparison of Step 502, execution advances directly to step 506 (the NO branch) or to step 506 through an intervening step 504 (the YES branch). In essence, processing along the YES branch from step 502 is indicative that pressure in the system is increasing while the NO branch is indicative that pressure is steady or falling. "NO" is taken as a sign to monitor leakage and "YES" indicates the process is not in a leak measurement cycle. Accordingly, at step 504, following a YES determination, the variable LeakStartTime is updated to the current clock and the variable LeakStartP is updated to the current pressure reading P(LastL). In this way once steady or declining pressure is detected the base values for subsequent calculations will have already been recorded and the values will reflect near peak pressure for the system and the time when peak pressure occurred. At step 506, following step 504, LeakTime will be calculated to be 0 since the variable LeakStartTime will have just been set equal to the clock. Otherwise, since LeakStartTime will not have updated, the step will operate in effect to increment the value for the variable LeakTime by the time that has passed since the last execution of step 506. However, rather than determining the increment, the entire accumulated time is recalculated each cycle.

Step 508 determines if a full one minute leak measurement phase has timed out, that is if LeakTime has grown to exceed 59. If the measurement cycle has not timed out processing follows the NO branch from step 508 to step 510 where it is determined if the brake pedal is down. The position of the brake pedal is known to body computer 44 from a brake position sensor 56. A down brake pedal indicates that the vehicle is using air pressure for activating the brakes and the measurements are used for the leak measurements while the brake system is actuated. Following the YES branch from decision step 510 leads to a second inquiry (step 512) to the effect of whether the break pedal was down the previous cycle through the routine, which is indicated by the flag "PedalFlag" being equal to 1. Assuming initially that the pedal was not depressed the NO branch from decision step advances the routine to execution of step 514, where the flag PedalFlag is reset to 1 and the variable PedalStart (indicating the time the pedal is initially depressed) is set equal to the Clock.

Next step 516 is executed. If step 516 is entered from step 514 then LeakTime (from step 506) and PedalTime (defined in Init list 500) will both equal 0 and the test produces a negative result (because LeakTime is not greater than 10). Following the NO branch from step 516 leads to a second decision step 534. Step 534 is a three part test, which again, the first time through the routine following a reset, cannot be satisfied because of the variable PedalTime and the flag SpeedFlag have values of 0. Following the NO branch from step 534 the variable PedalTimeW is set equal to PedalTime (initially 0) at step 540, PedalTime is reset to 0 and the flags DownFlag and SpeedFlag are set to 0.

The conditions of step 534 are satisfied when a minimum time of depression of the brake pedal, low vehicle speed and accumulated leak time (i.e. a period of steady or declining pressure) occur simultaneously. Following the YES branch from step 534 the flag SpeedFlag is reset to 0 (step 536) and a data point for the variable PartialLeakRate{n} is determined by taking the difference between LeakStartP and LeakEndP{n} and dividing the result by accumulated LeakTime. Next the results obtained may be passed to the routine System_Data_Leak (step 538). Next, at step 524, the variable PedalTimeW is set equal to PedalTime and PedalTime is then reset to 0. Steps 526, 528, 530 and 532 are then executed as already described. The routine concludes until clock conditions indicate return to step 502.

Returning to step 516 the circumstances leading to a YES result are considered. Here the variable PedalTime is 0 and the variable LeakTime is greater than 10. Recall all times are normalized based on engine speed, thus 10 is not assigned the unit "seconds". Steps 518 and 520 follow, with the flag SpeedFlag being reset to 0 and a partial period leak rate (PartialLeakRate{n}) being determined using a formula taking the difference between LeakStartP less LeakEndP{n−1} and dividing the result by LeakTime. Processing then continues at step 522 as previously described.

Following completion of step 542 a second group of variables and flags are reset. This set is required to be set upon initial determination of the beginning of a leakage monitor period. Steps 526, 528, 530 and 532 provide for setting: DownFlagW equal to DownFlag (see step 544, described below); LeakStartTime equal to the clock; LeakStartP (leak monitoring cycle start pressure) equal to the last pressure measurement (P(PLast)); MinuteFlagW equal to the current MinuteFlag and MinuteFlag is then set to 0. Execution then ends until the system clock determines the appropriate time to renew execution at Start.

Returning to step 512 consideration is given to the circumstance that PedalFlag was equal to 1. Depressing the brake pedal is a required part of testing the air compression and storage system. When the test is done manually the vehicle is not moving. In the automated routine described here the test is done when the vehicle is stopped or moving at no greater than a predetermined maximum speed. Following the YES branch from step 512 a flag termed DownFlag is set equal to 1 (step 544). Next, at step 546 it is determined whether vehicle speed (reported by vehicle speed sender 84) falls below a maximum limit (here 5 mph). If Speed equals or exceeds the threshold, the NO branch from the test is followed to decision step 548, where the status of the flag SpeedFlag is determined. Assuming SpeedFlag has not been reset to 1 (its initial value is 0) the test will fail and the NO branch is followed from step 548 to step 526 with the actions described above. The flag SpeedFlag is set following an execution path following the YES branch from step 546.

If the flag SpeedFlag equals 1 upon execution of decision step 548, the YES branch advances execution to step 558 where the flag DownFlag is set equal to 1 and the flag PedalFlag is set equal to 0. Next, at step 560 the variable PedalTime is set equal the difference between the variable Clock and the variable PedalStart, which was set from Clock previously. Execution then continues to decision step 516 as described above. This execution route also occurs along the YES branch from step 570. This route is consistent with a determination at step 510 that pedal is not down and determination at step 570 that the PedalFlag is set.

Returning to step 546 the circumstances relating to vehicle speed matching or falling below the threshold are considered. Following the YES branch from step 546 the variable PedalTime is assigned the value determined by subtracting PedalStart from the current value of Clock (step 550). Following step 550 the status of the flag SpeedFlag and the elapsed pedal depression time are checked at step 552. If SpeedFlag has previously been set and the brake pedal depression time exceeds a minimum threshold the YES branch is taken to step 562 where the status of the flag Rising is evaluated. This path merges with the NO branch from step 570, i.e. the execution path followed from that step in the PedalFlag was not high. The Rising flag is subject to being set in the routine Monitor_Charge_Time at steps 636 and 682. If the Rising flag is 0, the NO branch is taken to step 564 and the variable LeakEndP{n} is set to the last pressure measurement P(LastL) and the routine is exited.

The YES branch from step 562 leads to a determination as to whether the variable LeakTime exceeds the Clock less the quantity BackTime plus 6 units. BackTime is passed from the Monitor_Charge_Time routine, step 630. If a sufficient period has passed to generate a YES result, a partial period leak rate may be determined and processing advances to step 568 for determination of the variable PartialLeakRate{n}, which is equal to the pressure difference between LeakStartP and BackTrack (from step 630) divided by the period LeakTime less the difference between Clock and BackTime. Execution then advances to step 522 as already described.

A negative result from step 566 results in processing skipping to step 526 which has already been described. Similarly, a negative result at step 552, that is the failure of either condition of SpeedFlag equaling 1 or PedalTime not being greater than 2 (seconds at standard conditions) also results in the routine skipping to step 526, with intervening steps 554 and 556, which provide for confirming that SpeedFlag is set to 1 and for populating LeakEndP{n} with the pressure reading P(LastL).

The routine of FIG. 7 also provides for timing out of a full one minute pressure test. From step 508, following timing out of the variable LeakTime, the YES branch passes to step 572, which determines if the Rising flag has been set high. A yes result indicates an interruption having occurred prior to the timing out of the process, in which case the results can be used to determine a partial period leak rate. A NO result indicates a full minute period was accumulated. Steps 574 and 576 follow the respective results before the routine merges for setting of the MinuteFlag flag at step 578. Step 574 generates a value for PartialLeakRate{n} by dividing the pressure quantity (LeakStartP−BackTrack) by the period of LeakTime less the difference of Clock less BackTime. After step 578 the program advances to step 522 to pass data to the System_Data_Leak routine.

Figure 8:
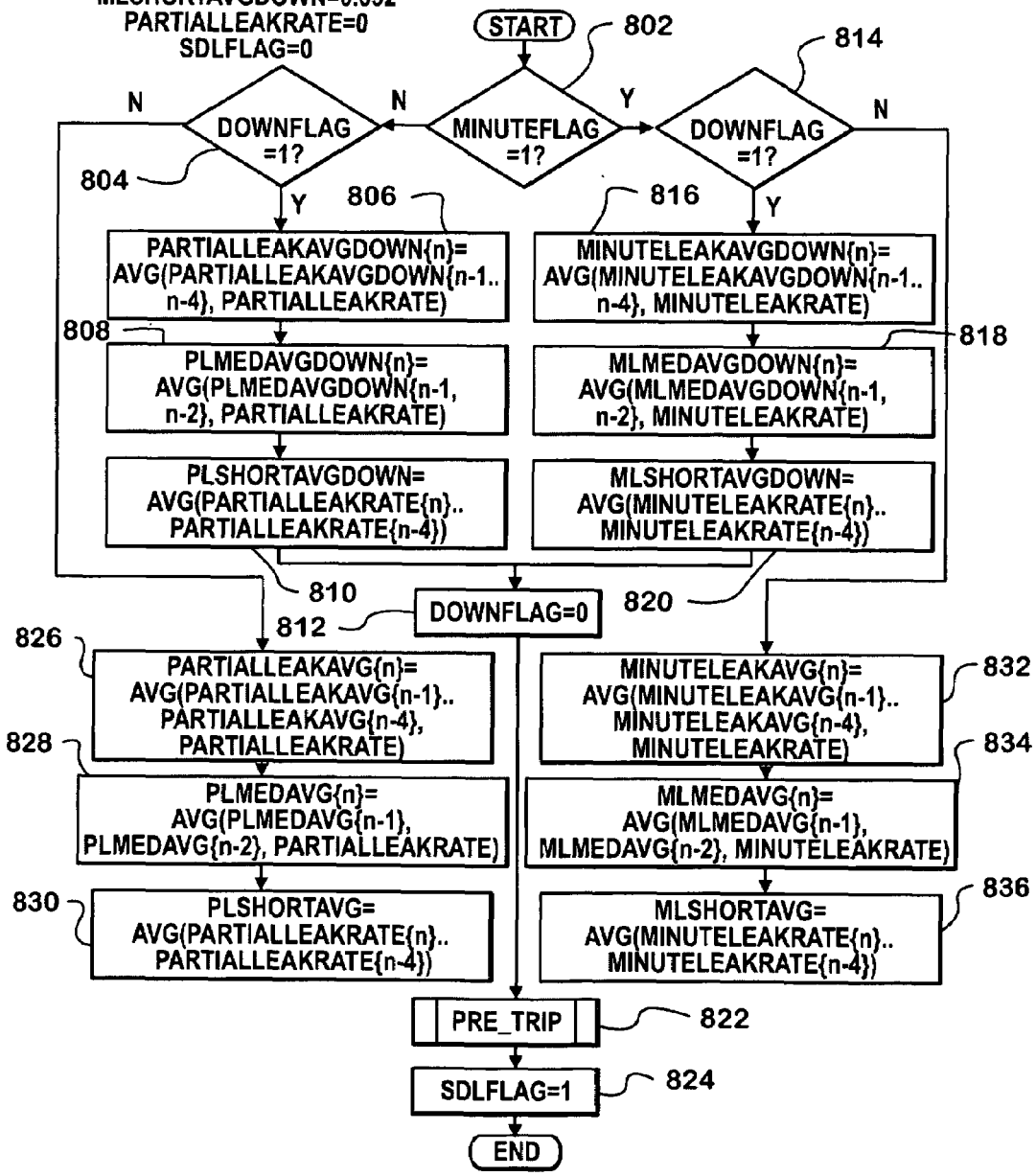

FIG. 8 illustrates a routine used to generate values for variables representing partial period leakage, leakage over a full minute, and average over various sample sizes stretching back in time, for both the brake pedal depressed and the brake pedal undepressed conditions. The variables representing all of these conditions are factory preset, or reset after servicing of the air compressor system, to various values as indicated in the Init (initial value) list 800. The various initial values indicated correspond to rates of pressure change or, in the case of SDLflag, are a flag. The program starts whenever called by step 522 in the routine of FIG. 7. The first step of the routine determines if a full minute has timed out (step 802, MinuteFlag=1?). If not, step 804 is executed along the NO branch to determine if the DownFlag has been set high, indicating a current brake pedal down event. By "current" is meant a currently depressed brake pedal or a brake pedal depression event since the last reset of the flag. In other words, a determination is made as to whether the leak rate was measured during the condition of the brake pedal being down or up. If down, the YES branch is followed to step 806 for updating of two running averages and one current average that are maintained corresponding to what are termed: the brake pedal down partial period leak rate average (step 806); the brake pedal down partial period medium sample size average (step 808); and the break pedal down partial period current average (step 810). The first variable is identified as PartialLeakAvgDown{n} and is an average of the four prior period averages and the current measurement of the leak rate over part of a minute. The second variable, termed PLMedAvgDown{n} is the average of the prior two period values for PLMedAvgDown and the current partial period of the leak rate. Finally, the last, least stable variable is the PLShortAvgDown which is the average of the current and four previous measured leak rates. In other words, each successive value has less "memory" of what occurred previously. PLShortAvgDown has no memory at all of events prior to the current and four most recent prior samples taken over partial periods.

We may now consider the steps of the routine corresponding to a determination that a full minute measurement was taken following the YES branch from step 802. The first step of the routine determines if a full minute has timed out (step 802, MinuteFlag=1?). If YES, step 814 is executed along the YES branch to determine if the DownFlag has been set high, indicating a current brake pedal down event. If a down event has occurred, the YES branch is followed to step 816 for updating of two running averages and one current average that are maintained corresponding to what are termed: the brake pedal down minute leak rate average (step 816); the brake pedal down medium sample size average (step 818); and the brake pedal down current short sample size average (step 820). The first variable is identified as MinuteLeakAvgDown{n} and is an average of the four prior period minute leak averages and the current leak rate measured over a full minute. The second variable, termed MLMedAvgDown{n} is the average of the prior two period values for MLMedAvgDown and the current measured over a full minute leak rate. Finally, the last, least stable variable is the MLShortAvgDown which is the average of the current and four previous measured full minute leak rates. In other words, each successive value has less "memory" of what went on previously until MLShortAvgDown, which has no memory at all of events prior to the current, i.e. most recent, and four most recent prior samples taken over full minute periods.

Following either of steps 810 or 820 step 812 is executed to reset DownFlag to 0. Thereafter the recomputed averages are passed to the Pre_Trip routine of FIG. 10 (step 822) and the SDLflag flag is set to 1 (step 824).

Consideration will now be given the circumstance where the DownFlag did not equal 1 at steps 804 and 814. If no brake pedal down event is detected at step 804, the NO branch is followed to step 826 for updating of two running averages and one current average that are maintained corresponding to what are termed: the partial period leak rate average (step 806); the partial period medium sample size average (step 808); and the partial period current average (step 810). The first variable is identified as PartialLeakAvg{n} and is an average of the four prior period averages and the current partial leak rate. The second variable, termed PLMedAvg{n} is the average of the prior two period values for PLMedAvg and the current partial leak rate. Finally, the last, least stable variable is the PLShortAvg which is the average of the current and four previous measured leak rates taken while no brake pedal down event has been encountered. Again, each successive value has less "memory" of what went on previously until PLShortAvg, which has no memory at all of events prior to the current and four most recent samples.

Following the NO branch from step 814. If no down event has occurred, the NO branch is followed to step 832 for updating of two running averages and one current average that are maintained corresponding to what are termed: the minute leak rate average (step 832); the medium sample size average (step 834); and the current short sample size average (step 836). The first variable is identified as MinuteLeakAvg{n} and is an average of the four prior period minute leak averages and the current full period leak rate. The second variable, termed MLMedAvg{n} is the average of the prior two period values for MLMedAvg and the current full period leak rate. Finally, the last, least stable variable is the MLShortAvg which is the average of the current and four previous measured full minute leak rates. Each successive value has less memory of what went on previously until MLShortAvgDown, which has no memory at all of events prior to the current and four most recent samples.

Figure 9:
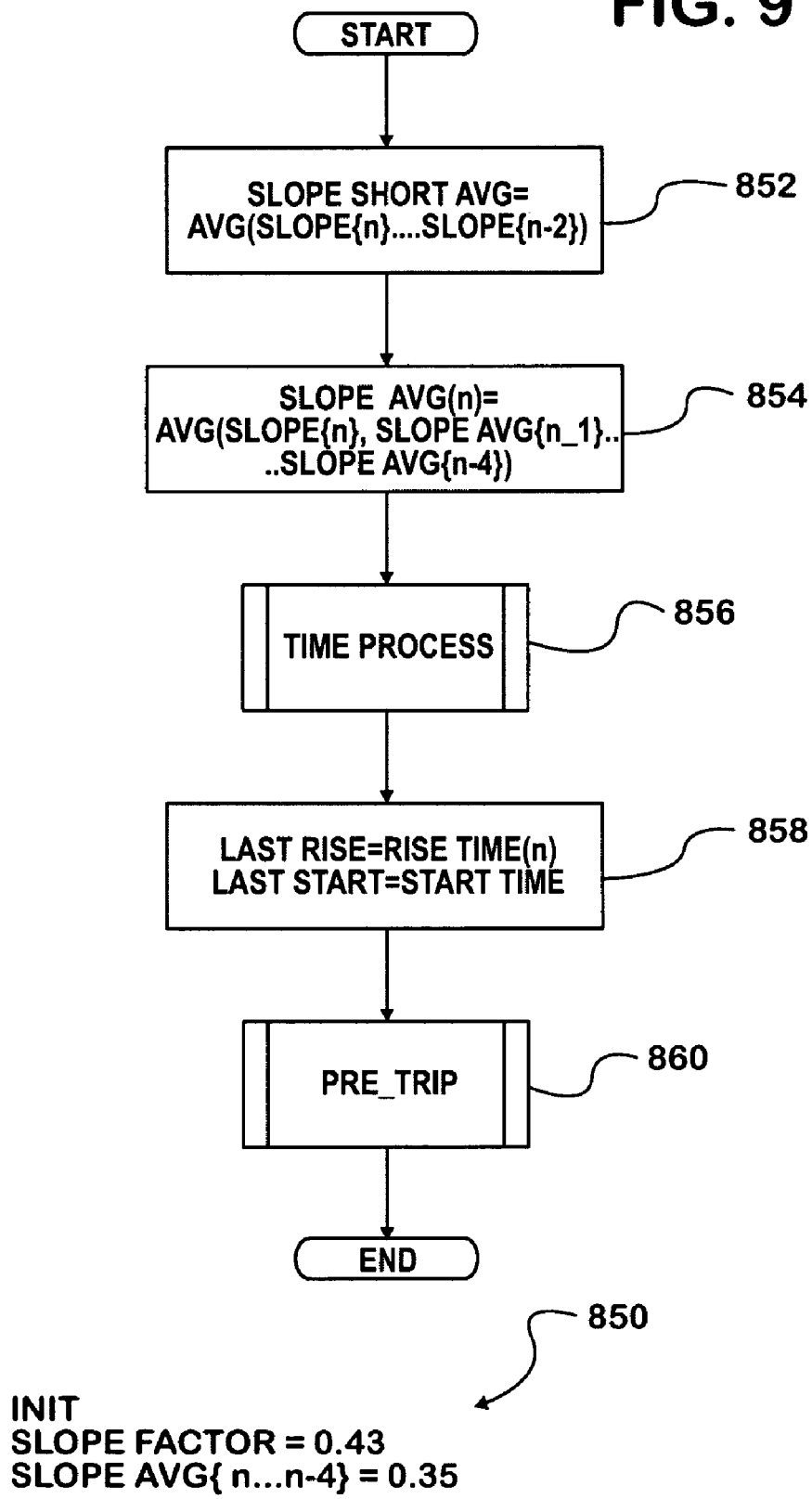

FIG. 9 is a flow chart for what is termed the System_Data_Charge routine. This routine determines average slopes from the slope stacks developed in the routine of FIG. 6. The routine is part of a larger routine which tracks compressor governor on time, a value not used in the inspection related functions implemented by the present invention. Two slope averages, corresponding to estimating pressurization times for the air pressure system are maintained. SlopeShortAvg is an average of the current and two most recent slope determinations. SlopeAvg{n} is the average of the current slope (Slope{n}) and previously determined slope averages for the four most recent periods. Step 856 labeled TimeProcess allows passing of the data to another routine which does not effect the current invention. Step 858 provides for determining a value for LastRise which is set equal to the current value for RiseTime{n} and LastStart which is set equal to StartTime. The data is then passed to the Pre_Trip routine, step 860.

Figure 10:
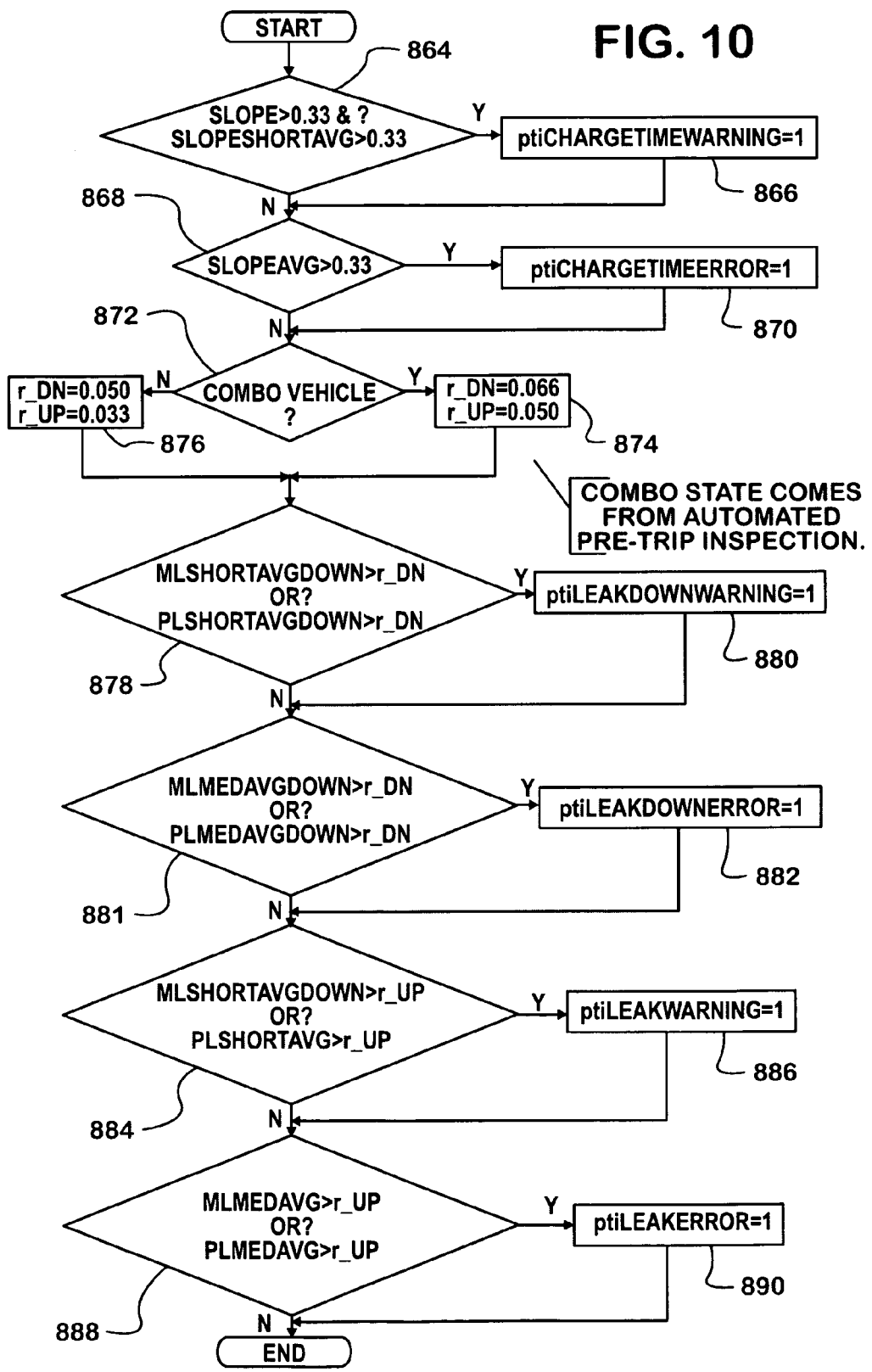

FIG. 10 is a flow chart for the Pre_Trip inspection routine, involving comparison of the values developed in the routines of FIGS. 8 and 9 against alarm level thresholds. The first comparison is at step 864 where the values Slope and SlopeShortAvg are compared against a first threshold warning level, which if exceeded by both variables results in a pre-trip inspection air compressor charge time warning flag being set (step 866). Next, the value SlopeAvg is compared to the same threshold, which if exceeded, results in a pre-trip inspection air compressor charge time error flag being set (step 870). Leakage rates can expected to be higher if a vehicle is a compound vehicle, i.e. one including both a tractor and trailer as opposed to just a tractor. Accordingly, before the leakage rate comparison tests are run, it is determined whether a trailer is present as indicated at step 872. Depending upon the result a different set of threshold comparison values is loaded (steps 876 or 874). All of the leakage rate tests fail if either component fails. At step 878 the values for MLShortAvgDown and PLShortAvgDown are compared against their respective thresholds, and, if either exceeds the maximum allowed period, a pre-trip inspection leak for brake down warning flag is set (step 880). At step 881 the values determined for MLMedAvgDown and PLMedAvgDown are compared against their respective thresholds, and, if either exceeds the maximum allowed period, a pre-trip inspection leak for brake down error flag is set (step 882). At step 884 the values for MLShortAvg and PLShortAvg are compared against the respective thresholds, and, if either exceeds the maximum allowed period, a pre-trip inspection leak warning flag is set (step 886). At step 888 the values for MLMedAvg and PLMedAvg are compared against their respective thresholds, and, if either exceeds the maximum allowed period, a pre-trip inspection leak error flag is set (step 890). Error flags are considered more serious than a warning flag, an error being taken as indication of failure while a warning is deemed as indicating trending toward failure.

For either type of result a warning is given to the operator indicating the result and directing a manual inspection of the system. Where the results do not indicate any need for a manual inspection, the driver is provided evidence to log that indicate the conditions for by-passing inspection were met. The invention provides time savings to vehicle operators by limiting driver/operator inspections to circumstances where possible problems have been detected.

While the invention is shown in only one of its forms, it is not thus limited but is susceptible to various changes and modifications without departing from the spirit and scope of the invention.

What is claimed is:

1. A air compression and storage system installed on a motor vehicle providing monitoring of system operating variables for conformance with predefined values, the system comprising:
   a compressed air storage tank and air distribution system;
   an air compressor coupled to the compressed air storage tank and air distribution system for charging the air storage tank;
   a governor responsive to pressure in the compressed air storage tank and air distribution system controlling cut-in and cut-out of the air compressor;
   an air pressure sensor located in communication with the compressed air storage tank and air distribution system for sensing air pressure and generating an air pressure signal; and
   a vehicle body computer connected to receive the air pressure signal and programmed to respond to values assumed by the air pressure signal for determining leakage rate and charging rate related values for the compressed air storage tank and air distribution system and for providing warning signals where leakage and changing rate values fail the predefined values.

2. The air compression and storage system as set forth in claim 1, further comprising:
   an air brake system connected to utilize compressed air from the compressed air storage tank and air distribution system;
   a brake pedal for actuating the air brake system; and
   a brake pedal position sensor connected to the information processor indicating status of the brake pedal.

3. The air compression and storage system as set forth in claim 2, further comprising:
   the vehicle body computer being further programmed to be responsive to status of the brake pedal for determining leakage in actuated and unactuated states of the air brake system.

4. The air compression and storage system as set forth in claim 3, further comprising:
   the vehicle body computer being further programmed to determine for leakage rate related values a current leakage rate for the actuated state of the air brake system and a current leakage rate for the unactuated state of the air brake system.

5. The air compression and storage system as set forth in claim 4, further comprising:
   the vehicle body computer being further programmmed to determine for leakage rate related values a plurality of averages of the leakage rates for the actuated and unactuated states of the air brake system over predetermined periods of time.

6. The air compression and storage system as set forth in claim 3, further comprising:
   the vehicle body computer being further programmed to determine a current charging rate for the charging rate related values.

7. The air compression and storage system as set forth in claim 6, further comprising:
   the vehicle body computer being further programmed to determine charging rate related values based on averages of engine RPM's over predetermined periods of time.

8. The air compression and storage system as set forth in claim 5, wherein the motor vehicle is a combination vehicle.

9. The air compression and storage system as set forth in claim 7, wherein the motor vehicle is a combination vehicle.

10. An air compression, storage and distribution system for a motor vehicle providing monitoring for compliance with threshold operating norms, the system comprising:
    a governor responsive to changes in air pressure in the air compression, storage and distribution system for pumping air into the system;
    a pressure sensor coupled to a point in the air compression, storage and distribution system for generating a signal reporting pressure at that point;
    data processing means responsive to the signal reporting pressure for determining rates of charging and leakage of the air compression, storage and distribution system; and
    the data processing means providing for comparing the determined rates of charging and leakage against thresholds and generating warnings should either of the rates of charging or of leakage not meet the thresholds.

11. An air compression, storage and distribution system as set forth in claim 10, further comprising:
    the air compression, storage and distribution system being installed on a motor vehicle and coupled to support operation of an air brake system; and
    a brake pedal position sensor connected to apply a brake pedal position signal to the data processing means.

12. An air compression, storage and distribution system as set forth in claim 11, the motor vehicle further comprising a combination vehicle including a truck and a tractor, both of which are equipped with the air brake system.

13. An air compression, storage and distribution system as set forth in claim 12, further comprising:
    the data processing means being programmed for determining if a rate of leakage measurement occurred with air brake system actuated.

14. An air compression, storage and distribution system as set forth in claim 13 further comprising:
    the data processing means being further programmed for developing various rates of leakage measurements including a most recent measurement rate and at least a first average including a contribution from the most recent measurement.

15. An air compression, storage and distribution system as set forth in claim 14, further comprising:
    the data processing means being further programmed for developing various rates of charging measurements including a most recent measurement and at least a first average including a contribution from the most recent measurement.

* * * * *